Sept. 23, 1930.
F. C. BELL ET AL
LAWN RAKE
Re. 17,810
Original Filed Dec. 14, 1921
2 Sheets-Sheet 1
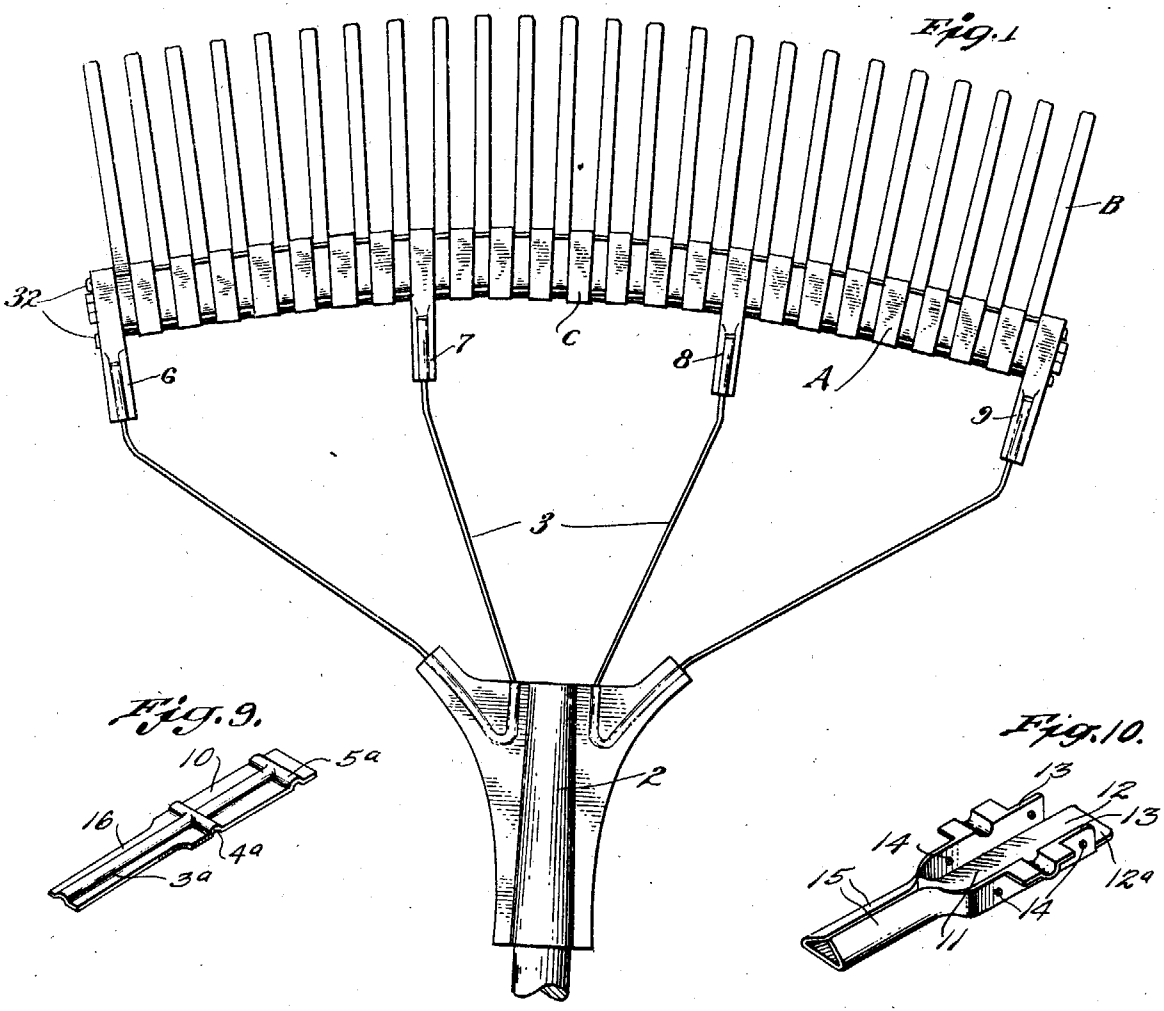
INVENTORS
FRED C. BELL
SAMUEL SKELLY
BY Chas. E. Townsend
ATTY.

Sept. 23, 1930.
F. C. BELL ET AL
LAWN RAKE
Re. 17,810
Original Filed Dec. 14. 1921 2 Sheets-Sheet 2
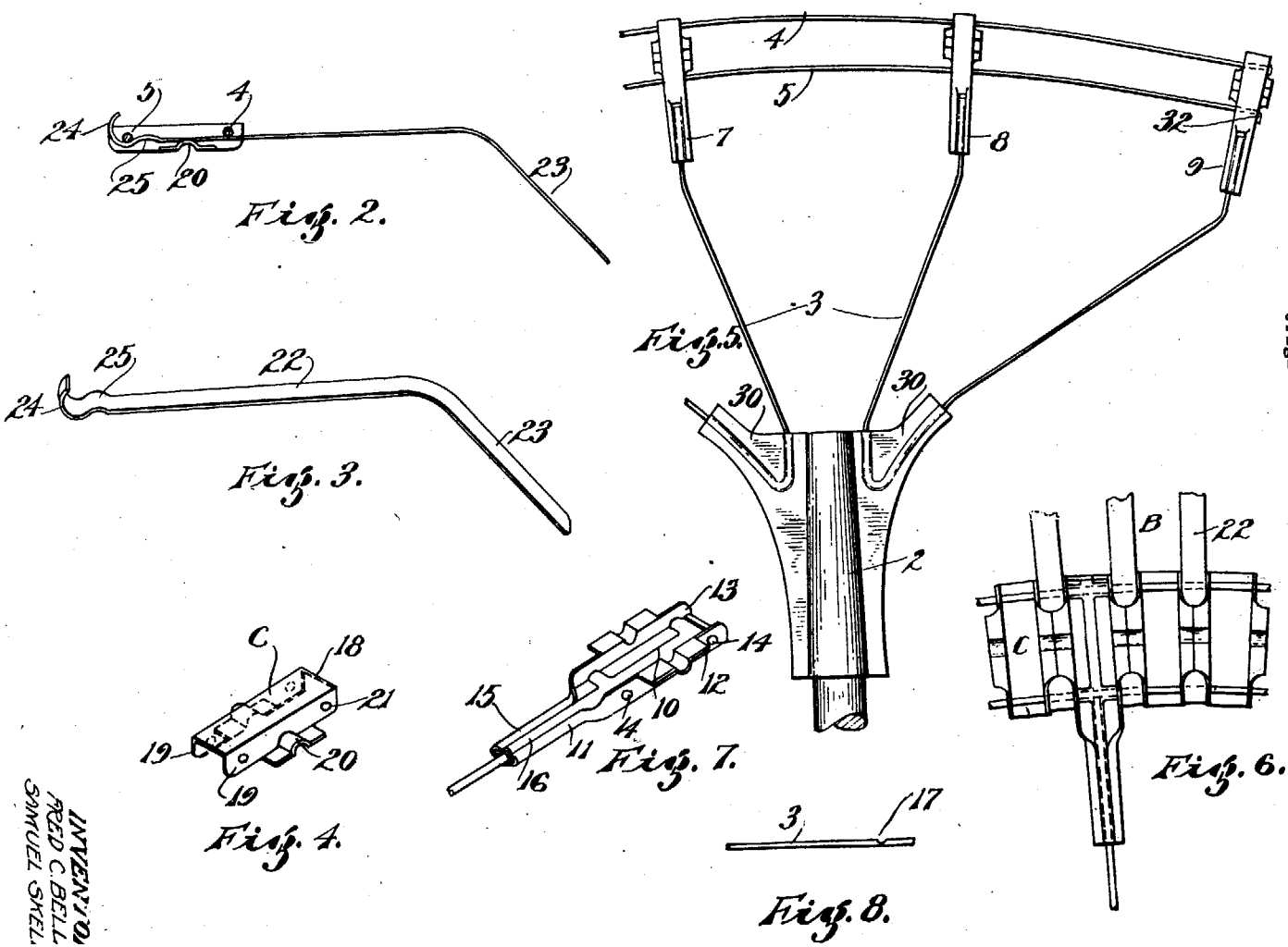
INVENTOR
FRED C. BELL
SAMUEL SKEL.
BY Theo E. Jennings
ATTY.

Reissued Sept. 23, 1930

Re. 17,810

REISSUED

UNITED STATES PATENT OFFICE

FRED C. BELL AND SAMUEL SKELLY, OF ALAMEDA, CALIFORNIA

LAWN RAKE

Original No. 1,699,947, dated January 22, 1929, Serial No. 522,277, filed December 14, 1921. Application for reissue filed November 22, 1929. Serial No. 409,165.

This invention relates to an all metal rake, and particularly to that type which is employed for garden work, lawns, and the like.

One of the objects of the present invention is to generally improve and simplify rakes of the character described; to provide a rake constructed throughout of spring steel, sheet metal stampings, and wire; a rake in which the teeth or tines are flexible and so supported and secured that they may be individually removed and replaced when broken or worn; a rake, the several parts of which may be rapidly and readily assembled during the manufacture thereof; further a rake which is flexible as a whole to permit it to conform with the contour of the surface being raked.

Other objects will hereinafter appear.

The invention consists of the parts and the construction, combination and arrangement of parts as hereinafter more fully described and claimed, having reference to the accompanying drawings, in which—

Fig. 1 is a plan view of the rake.

Fig. 2 is a cross section on line 2—2 of Fig. 1.

Fig. 3 is a perspective view of one of the tines.

Fig. 4 is a perspective view of one of the spacing blocks.

Fig. 5 is a plan view of the rake head showing the tines and spacing blocks removed.

Fig. 6 is a detailed bottom view of the rake.

Fig. 7 is a perspective view showing the method of securing the wires which are interposed between the head of the rake and the handle socket.

Fig. 8 is a detail view of the outer end of one of the wire arms 3, showing notch 17 formed therein.

Fig. 9 is a perspective view of one section of a clamp used in connection with our invention, and Fig. 10 is a perspective view of the counterpart of the section shown in Figure 9.

Referring to the drawings in detail, and particularly to Figs. 1 and 5, A indicates in general the head of the rake, 2 a handle socket or clamp, and 3 a plurality of intermediate wire arms by which connection is formed between the handle socket and the head. The head proper, referring more particularly to Fig. 5, consists of a pair of interspaced parallel wire rods, such as indicated at 4 and 5. These rods are secured between a series of clamps, such as indicated at 6, 7, 8 and 9, and the clamps in turn are connected with the handle socket 2 by means of the intermediate spring or wire arms 3.

The clamps 6, 7, 8 and 9, are, practically speaking, identical in construction. They are formed of sheet metal stamps and each clamp consists of two sections 10 and 11, as shown in Fig. 7. The section 11 consists of a top section 12, a pair of side sections 13, which are perforated at each end, as at 14, to permit the rods 4 and 5 to pass therethrough, and a clamping section 15 which embraces an extension 16 formed on the section 10.

The section 10 is platelike in formation and is provided with a central longitudinally extending raised portion $3^a$ to receive the arm 3. The plate 10 is also provided with two crosswise extending portions $4^a$ and $5^a$ which are adapted to align with the perforations 14 to receive and secure the wires 4 and 5. The sections 10 and 11 are assembled by placing the plate 10 interiorly of the member 11 between the side flanges 13.

An exterior lip $12^a$ is formed on the section 12. This is bent over the plate 10 and the sections 15 are bent over the extension 16. The members 10 and 11 are thus assembled with relation to each other and the wires or rods 3, 4 and 5 become clamped between the same and are rigidly secured.

Each clamp serves three functions: first that of supporting and maintaining the spacing betweeen the rods 4 and 5 of the head; secondly that of clamping the spring or wire arms 3; and third, that of a partial support of certain tines, and as such is the case bearing lugs 20, similar to other bearing lugs hereinafter to be described, are provided.

The ends of the wire arms are placed between the sections 10 and 11, as shown in Figs. 1, 5 and 7, and the sections 10 and 11 are then clamped with relation to each other by the extending side sections 15. These sections are bent over the extension 16, and they are pressed, beaded or otherwise compressed, to securely embrace and clamp the wire arms 3 interposed between the sections 10 and 11.

The outer end of each wire arm is preferably nicked or flattened as indicated at 17, see Fig. 8, and the extension 16 may therefore be indented or clinched so as to engage the notches 17 in the wire arms, thus locking and securing the wire arms against endwise movement. The clamping sections also form a third function, to-wit, that of a spacer. Other spacing members are however required for the purpose of maintaining a fixed separation between the tines generally indicated at B, and such spacers are shown in Figs. 1 and 6, but particularly in Fig. 4. The intermediate spacers disposed between the clamping sections 6, 7, 8 and 9, are generally indicated at C.

By referring to Fig. 4, it will be seen that each spacer consists of a top section 18, downwardly turned side sections 19, and a projecting bearing lug 20, that is a bearing lug 20 is formed on each side section 19 and its function will be hereinafter described. Each spacing member C is also perforated at opposite ends as indicated at 21, to permit the wire rods 4 and 5 to extend therethrough. The tines generally indicated at B are more particularly illustrated in Figs. 2 and 3. Each tine is constructed of flat spring steel and consists of a horizontal section 22, an angular section 23, and a hooked end section 24, which together with the hump 25 formed on the horizontal section 22, serves as an interlocking mechanism hereinafter to be described.

The handle socket 2 in this instance is preferably constructed of sheet metal. It is formed of two sections which are riveted, seamed or otherwise interlocked or secured with relation to each other. The metal forming the handle socket is extended near the lower end, as shown at 30, and is recessed to receive the spring arms 3, that is there are two spring arms employed, each one being looped to pass between the flattened extensions 30 and to be clamped therebetween.

The clamps 6, 7, 8 and 9, are next applied, as shown in Fig. 5. A suitable number of spacing blocks C are then placed between the clamps and the whole of them are then assembled by inserting the wire rods 4 and 5, which are secured by riveting or bending the outer ends as indicated at 32. The rake thus assembled is ready to receive the tines B, which may be inserted one by one. They are inserted between the clamps 6, 7, 8 and 9, and the spacing blocks C, as shown in Fig. 1, and as such assume a horizontal position with relation to the rods 4 and 5 and the spacing blocks. The outer ends of the tines however assume an angular position as indicated at 23 and these are the points that engage the lawn or surface to be raked.

When inserting the tines, it is accomplished by passing the angular end 23 under the rod 5, see Fig. 2, then over the supporting lug 20 and finally under the wire rod 4. The whole tine is then forced in a forward direction until the position is assumed, as shown in Fig. 2. At this point the hook 24 will engage the rod 5 and the hump 25 will engage the opposite side of the rod. An interlock is thus formed between each tine and the rod 5, and endwise movement is prevented when the normal function of the rake is considered. However intentional removal, when the tines are broken or worn, is permitted at any time as it will only be necessary to grasp the hook 24 and depress it a sufficient distance to clear the hump with relation to the rod 5, when the tine may be pulled away from the spacing blocks in a rearwardly direction and a new tine placed in its position.

The tines as previously stated are preferably constructed of flat spring steel and as such is the case it can readily be seen that the interlock formed is spring actuated, and as such automatically and normally maintains a dependable lock which insures against endwise removal of the teeth, except when it is intentionally desired to do so.

The rake illustrated in the present instance is particularly intended for lawn work and the like; for instance to remove leaves, paper, straw, sticks, etc., and as such is the case flexibility and gathering action form important features. Flexibility is obtained laterally, due to the fact that the head portion of the rake consists of wire rods 4 and 5, which may bend and yield to a considerable extent, and it is further due to the fact that these rods are connected or secured with relation to the handle socket by means of the flexible spring or wire arms 3.

Further flexibility is obtained by constructing the tines of flat spring steel and bending and supporting the same individually as described, that is each tooth or tine can yield with relation to the surface traversed and it can therefore be seen that practically any degree of flexibility may be obtained. Gathering action is obtained by arcing or curving the head or rods 4 and 5, as shown in Figs. 1 and 5, and spreading of the leaves or other material handled is thus avoided.

Besides flexibility to permit the rake to conform to contours of varying formation while raking, it is obvious that many other important features are involved, for instance economy in manufacture is obtained by constructing the rake of metal throughout, and by providing parts which can be cheaply manufactured and quickly and readily assembled.

Other important features are a three point support for each individual tooth, as shown in Fig. 2, and a spring actuated interlock for each individual tooth or tine, which secures the teeth during the normal functioning of the rake, and at the same time permits removal of the teeth when worn or broken.

A three point support is readily formed by projecting the sides of the spacing blocks C, as indicated at 20, that is the spacing blocks are first of all interspaced by these projecting lugs, and a central support is at the same time provided for each tine, as shown at 20, in Fig. 2, the strain or load of which is distributed to two spacing blocks, one on each side of the tine as one-half of a bearing lug is presented by one spacing block, and the other one-half of the support by the adjoining spacing block. This is perhaps most clearly illustrated by the partial bottom view shown in Fig. 6.

While certain features of the present invention are more or less specifically illustrated, we wish it understood that various changes in form and proportion may be resorted to within the scope of the appended claims, similarly that the materials and finish of the several parts employed may be such as the experience and judgment of the manufacturer may dictate or varying uses may demand.

Having thus described our invention, what we claim and desire to secure by Letters Patent is—

1. A rake comprising a head member, a plurality of flat spring steel tines independently and detachably mounted on said head member, a hump shaped yielding member for each tine, and means on the rake head with which the hump shaped yielding members are adapted to interlock, said means normally securing the tines to the head member and permitting said tines to be manually removed endwise from the head.

2. In a rake of the character described a head member, a plurality of flat spring steel tines carried thereby, said head member forming a three-point support for each tine relative to which the tines are endwise movable, a spring actuated locking member, on each tine, normally securing the same against endwise removal in one direction, and a hook-shaped member on one end of each tine positively securing the tines against endwise removal in an opposite direction.

3. In a rake of the character described, a head member, a plurality of tines carried thereby, said head member forming a three-point support for each tine relative to which the tines are endwise movable and a yielding member on each tine engageable with one of the supports and securing the tines against endwise removal.

4. In a rake of the character described an elongated head, said head being flexible in a vertical plane, a rake handle, flexible arms disposed between the handle and the rake to flexibly support the head, a plurality of flat narrow spring steel tines secured to the head and also flexible in a vertical direction, said tines being disposed on planes substantially parallel to the longitudinal axis of the rake handle and the forward end of each tine being bent downwardly at an angle to said longitudinal axis.

5. In a rake of the character described a head member comprising a pair of interspaced parallel rods, a plurality of interspaced spacing blocks carried by the rods, a tine disposed between each spacing block, a supporting lug on each spacing block, forcing each tine upwardly against the rods, and an interlocking member on each tine engageable with one of the rods.

6. In a rake of the character described, a head member comprising a pair of interspaced parallel flexible wire rods, a plurality of clamping members supporting the rods and maintaining the spacing between the same, flexible arms attached to the clamping members and forming a flexible support for the wire rods and the clamping members, a plurality of spacing blocks supported by the wire rods intermediate the clamping members, a plurality of tines disposed between the spacing blocks and the clamping members and supporting lugs formed on the sides of the spacing blocks and the clamps, said lugs, together with the rods, forming a three point support for each tine, and an interlocking member on each tine engageable with one of the rods.

7. In a rake of the character described, a tine consisting of a flat, narrow, thin strip of spring metal, the main portion of each tine presenting a horizontal position, the forward end of each tine being bent downwardly at an angle thereto, a hump formed at the opposite end of the horizontal portion of the tine, and a hook like portion forming a continuation of the hump.

8. In a rake of the character described a spacing block consisting of a channel shaped section of metal, the channel sides of each block being perforated at each end, and a bearing lug formed on each side of the channel member.

9. In a rake of the character described a head member comprising a pair of interspaced wire rods, said rods being bent to form a curve on a horizontal plane, and said rods being flexible on a vertical plane, a plurality of tines secured to said wire rods and flexible on a vertical plane, flexible arms attached to the wire rods to flexibly support the rods and tines, and a handle to which the opposite ends of the flexible arms are attached.

10. In a rake of the character described, an elongated head, said head being bent to form a curve on a horizontal plane and said head being flexible to a vertical plane, a rake handle, flexible arms disposed between the handle and the rake head to flexibly support said head, a plurality of tines secured to said head and also flexible in a vertical plane, and said tines being disposed on planes substantially parallel to a longtudinal axis drawn through the rake handle.

11. In a rake of the character described, a head member, a plurality of tines carried thereby, said head member providing a pair of transversely extending interspaced tine supports, and means interconnecting said supports, each of said tines having one of its ends bent to hookingly engage with the rearmost of said supports to restrain endwise removal of the tines, the foremost of said supports engageable with each tine to make reenforcing engagement therewith.

12. In a rake of the character described, a head member, a plurality of tines carried thereby, said head member providing a pair of transversely extending interspaced tine supports, and means interconnecting said supports, each of said tines having a portion adjacent one of its ends bent to make a hook engagement; with one of said supports to restrain endwise removal of the tines, the other of said supports engageable with each tine to make reenforcing engagement therewith.

13. In a rake of the character described, a head member, a plurality of flat spring steel tines carried thereby, said head member providing a pair of transversely extending interspaced tine supports, and means interconnecting said supports, each of said tines having one of its ends bent to hookingly engage with the rearmost of said supports to restrain endwise removal of the tines, the foremost of said supports engageable with each tine to make reenforcing engagement therewith, said tines restrained from rotational movement by engagement of their flat surfaces with said supports.

14. In a rake of the character described, a head member, a plurality of flat spring steel tines carried thereby, said head member providing a pair of transversely extending interspaced tine supports, and means interconnecting said supports, each of said tines having one of its ends bent into substantially the form of a hook to make substantially hooking engagement with the one of said supports to restrain endwise removal of the tines, the other of said supports engageable with each tine to make reenforcing engagement therewith, said tines restrained from rotational movement by engagement of their flat surfaces with said supports.

15. In a rake of the character described, a head member, a plurality of tines carried thereby, said head member providing a pair of transversely extending interspaced tines supports, and means interconnecting said supports, the foremost of said supports engageable with each tine at a point longitudinally spaced from its rear end to make reenforcing engagement therewith, said tine terminating in a deflected portion making interlocking engagement with the rearmost of said supports to restrain endwise removal of the tines, said rearmost support cooperating with said foremost support to hold the supported ends of the tines normally in an approximately horizontal plane relative to each other.

16. In a rake of the character described, a head member, a plurality of resilient tines carried thereby, said head member providing a pair of transversely extending interspaced tine supports, and means interconnecting said supports, each of said tines comprising a laterally deflected portion engageable with one of said supports to restrain endwise removal of the tines, the other of said supports engageable with each tine to make reenforcing engagement therewith, each of said resilient tines being bodily and individually removable endwise from the supports, by the effect of manually exerted pressure on the deflected portion of the tine to effect disengagement therebetween and the support adapted to be engaged thereby.

17. In a rake, the combination with a rake head providing a pair of transversely extending interspaced tine supports, of a plurality of spring tines carried thereby, each of said spring tines engageable with both of said supports, means for said head disposed intermediate said supports engageable with each of said tines and retaining the tines on the head by the effect of the inherent resiliency of the spring material of the tines reacting against the engaged portions of said head, including at least one of said supports.

18. In a rake, a transversely extending head therefor having pairs of longitudinally disposed restricted openings therethrough, a plurality of tines carried by the head, each of said tines being of flat narrow thin strip spring metal, comprising a substantially straight intermediate portion, a ground engaging tip portion extending substantially angularly therefrom, and an end adapted for insertion in a rake head, comprising longitudinally spaced relatively bended portions projected through said restricted openings of said head and being of such form as to engage with surface portions thereof to resist endwise removal of the tine therefrom.

19. A rake comprising a head, a plurality of spring steel tines each of which providing a single prong and is independently and detachably mounted therein, said head member comprising spaced portions engaging said tines to resiliently deflect the same, said tines and head being retained in interlocking engagement by the inherent resiliency of the metal of the tine, reacting against the deforming pressure of the said head portions.

20. A rake comprising a head, a plurality of spring steel tines each of which providing a single prong and is independently and detachably mounted therein, said head member comprising spaced portions engaging the same side of each of said tines, and a third portion engaging the other side of each of said tines to resiliently deflect the same, said tines and head being retained in interlocking engagement by the inherent resiliency of the metal of the tine, reacting against the deforming pressure of the said head portions.

21. In a rake of the character described, a head member, a plurality of flat spring steel tines carried thereby, each providing a single rake prong, said head member providing a pair of transversely extending spaced tine supports, interconnecting said supports and means to connect at least one of said supports to a rake handle, each of said tines having an off-set portion adapted to interlock with one of said supports to restrain end-wise removal of the tine relative to the support, each of the tines restrained from rotational movement by contracting engagement with one of said supports.

In witness whereof, we hereunto affix our signatures, this 27th day of October, 1929.

FRED C. BELL.
SAMUEL SKELLY.